(12) United States Patent
Eggert et al.

(10) Patent No.: US 11,239,924 B2
(45) Date of Patent: Feb. 1, 2022

(54) PER-CHANNEL MODULATION ERROR RATIO (MER) CALIBRATION AND DETERMINATION ON A MULTI CHANNEL RECEIVER

(71) Applicant: VIAVI SOLUTIONS INC., San Jose, CA (US)

(72) Inventors: Loren R. Eggert, Indianapolis, IN (US); Daniel K. Chappell, Greenwood, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 41 days.

(21) Appl. No.: 16/910,635

(22) Filed: Jun. 24, 2020

(65) Prior Publication Data

US 2020/0412462 A1      Dec. 31, 2020

Related U.S. Application Data

(60) Provisional application No. 62/868,192, filed on Jun. 28, 2019.

(51) Int. Cl.
| | | |
|---|---|---|
| H04B 3/46 | (2015.01) | |
| H04B 17/21 | (2015.01) | |
| H04B 17/336 | (2015.01) | |
| H04L 1/20 | (2006.01) | |
| H04L 1/00 | (2006.01) | |
| H04B 17/26 | (2015.01) | |

(52) U.S. Cl.
CPC ............. *H04B 17/21* (2015.01); *H04B 17/26* (2015.01); *H04B 17/336* (2015.01); *H04L 1/0003* (2013.01); *H04L 1/206* (2013.01)

(58) Field of Classification Search
CPC ...... H04B 17/21; H04B 17/26; H04B 17/336; H04L 1/0003; H04L 1/206
USPC ............... 375/224, 260, 261, 227, 298, 340
See application file for complete search history.

(56) References Cited

U.S. PATENT DOCUMENTS

2010/0158093 A1*   6/2010   Thompson ........... H04B 17/309
                                                                    375/227
2013/0004179 A1*   1/2013   Nielsen .................... H04B 3/02
                                                                    398/115

OTHER PUBLICATIONS

ITU-T, Telecommunication Standardization Sector of ITU, "Measurement of the quality of service Methods for the measurement of parameters in the transmission of digital cable television signals, Series J: Transmission of Television, Sound Programme and Other Multimedia Signals, J.142", ITU, May 2000, pp. 1-45.*

* cited by examiner

*Primary Examiner* — Tesfaldet Bocure
(74) *Attorney, Agent, or Firm* — DLA Piper LLP (US)

(57) ABSTRACT

A method, apparatus and system for per-channel MER calibration and determination on a multi-channel receiver.

18 Claims, 6 Drawing Sheets

| Frequency 402 | Carrier Level 404 | Noise Floor 406 | Theoretical MER ceiling 408 | Measured MER 410 | Linear Theoretical MER ceiling 408 | Linear Measured MER 414 | Calibrated MER 416 | Calibrated MER With End Limit 418 | Actual MER 420 |
|---|---|---|---|---|---|---|---|---|---|
| 93 | -7.3 | -43.5 | 36.2 | 31.2 | 0.000239883 | 0.000758578 | 32.85088539 | 32.9 | 33 |
| 99 | -7.1 | -43.5 | 36.7 | 31.3 | 0.000229087 | 0.00074131 | 32.90540521 | 32.9 | 33 |
| 105 | -6.9 | -43.7 | 36.8 | 32 | 0.00020893 | 0.000630957 | 33.74659011 | 33.7 | 34 |
| 111 | -6.6 | -43.6 | 37 | 32.2 | 0.000199526 | 0.00060256 | 33.94659011 | 33.9 | 34 |
| 117 | -6.4 | -43.8 | 37.4 | 32.9 | 0.00018197 | 0.000512861 | 34.80314654 | 34.8 | 35 |
| 123 | -6.1 | -44 | 37.9 | 32.9 | 0.000162181 | 0.000512861 | 34.55088539 | 34.6 | 35 |
| 129 | -5.9 | -43.9 | 38 | 33.7 | 0.000158489 | 0.00042658 | 35.71719062 | 35.7 | 36 |
| 135 | -5.6 | -43.9 | 38.3 | 33.8 | 0.000147911 | 0.000416869 | 35.70314654 | 35.7 | 36 |
| 141 | -5.5 | -44.1 | 38.6 | 34.5 | 0.000138038 | 0.000354813 | 36.6399088 | 36.6 | 37 |
| 147 | -5.3 | -44 | 38.7 | 34.6 | 0.000134896 | 0.000346737 | 36.7399088 | 36.7 | 37 |
| 153 | -4.9 | -43.8 | 38.9 | 35.3 | 0.000128825 | 0.000295121 | 37.79118282 | 37.8 | 38 |

PER-CHANNEL MODULATION ERROR RATIO (MER) CALIBRATION AND DETERMINATION ON A MULTI CHANNEL RECEIVER

CROSS REFERENCE TO RELATED APPLICATION

This application claims priority to U.S. Provisional Application No. 62/868,192 filed on Jun. 28, 2019, which is hereby incorporated by reference in its entirety.

DETAILED DESCRIPTION OF SEVERAL EMBODIMENTS

Embodiments described herein may be configured to provide a method, apparatus and system for per-channel MER calibration and determination on a multi-channel receiver. In one embodiment, a computer-implemented method is provided. The method is performed on a test instrument adapted to monitor one or more channels in a multi-channel network and may comprise determining a noise floor of the test instrument. For each channel of the one or more channels being monitored by the test instrument, the method comprises: measuring an input signal received over the channel; determining a theoretical modulation error ratio (MER) ceiling based on the input signal and the noise floor of the test instrument; measuring an MER for the channel; and computing a calibrated MER based on a comparison of the measured MER to the theoretical MER ceiling.

In another embodiment, a test instrument for monitoring one or more channels in a multi-channel network is provided. The test instrument comprises a storage device; and a processor executing program instructions stored in the storage device and being configured to determine a noise floor of the test instrument. For each channel of the one or more channels being monitored by the test instrument, the processor is further configured to: measure an input signal received over the channel; determine a theoretical modulation error ratio (MER) ceiling based on the input signal and the noise floor of the test instrument; measure an MER for the channel; and compute a calibrated MER based on a comparison of the measured MER to the theoretical MER ceiling.

In one or more embodiments, the calibrated MER is clipped by a predetermined end limit. By calibrating the MER determination for each channel, the disclosed principles can improve the MER accuracy on all channels.

Two-way hybrid fiber-coaxial (HFC) networks are shared bi-directional networks with point-to-multipoint transmission in the downstream direction, and multipoint-to-point transmission in the upstream direction. Signals are distributed via a fiber optic connection from a head-end to a node that converts the optical signal to an electrical signal, and then distributes the signals to residences via a tree and branch coaxial cable distribution network. At the subscriber side, terminal equipment supports the delivery of cable services (video, data and voice services) to subscribers, via cable modems. Data and voice services are supported by cable modems and communication gateways, respectively, which require the use of an upstream signal path. The network uses a fiber optic upstream signal path from the node to the head-end. A return band is used to support transmissions from devices at subscribers' premises back to the head-end. In such networks, many cable modems may compete for communication bandwidth in both the upstream and downstream directions.

A cable modem generally uses standardized communication protocol based on the Data over Cable System Interface Specification (DOCSIS) to access data services through the cable network, by using the downstream path to indicate exactly when each modem is permitted to transmit in the upstream direction. These protocols use digital modulation techniques such as quadrature amplitude modulation (QAM). Ideally, using QAM, a signal transmitted by a transmitter or received by a receiver would have all constellation points precisely at their ideal locations. Unfortunately, however, various factors such as e.g., noise, low image rejection ratio, phase noise, carrier suppression, distortion, etc. may cause the actual constellation points to deviate from their ideal locations. As can be appreciated, service providers often perform tests to ensure the quality of the services being provided. One known method for testing a network using digital modulation such as e.g., QAM, is to determine the modulation error ratio (MER) of its channels. The higher the MER, the better the network is performing.

The inventors have determined that in a high tilt environment (i.e., an environment where the tilt is greater than 5 dB per GHz), the MER on the lower level channels analyzed by a conventional test instrument is degraded because e.g., the instrument is using a standard MER equation. Because the accuracy of the MER determination is important to determine the performance of the network, this situation is undesirable. For example, inaccurate MER determinations may cause the service provider to perform unnecessary and costly testing, unscheduled maintenance or other countermeasures chasing down a problem that may not exist.

Possible solutions to this problem may include adding filters such as e.g., band filters or other circuitry to filter out high amplitude signals from the input signal to measure the low input signals. This solution, however, is undesirable as it requires, among other things, hardware changes to the test instrument. Accordingly, there is a need and desire for a better mechanism for making MER determinations in a multi-channel environment.

According to the disclosed principles, MER determinations may be accurately achieved using the per-channel MER calibration and determination method disclosed herein. For example, in accordance with the disclosed principles, a noise floor of the test instrument is measured and a novel algorithm is used to interpret per-channel MER based in part upon the noise floor, as described below in more detail.

Figure 1:
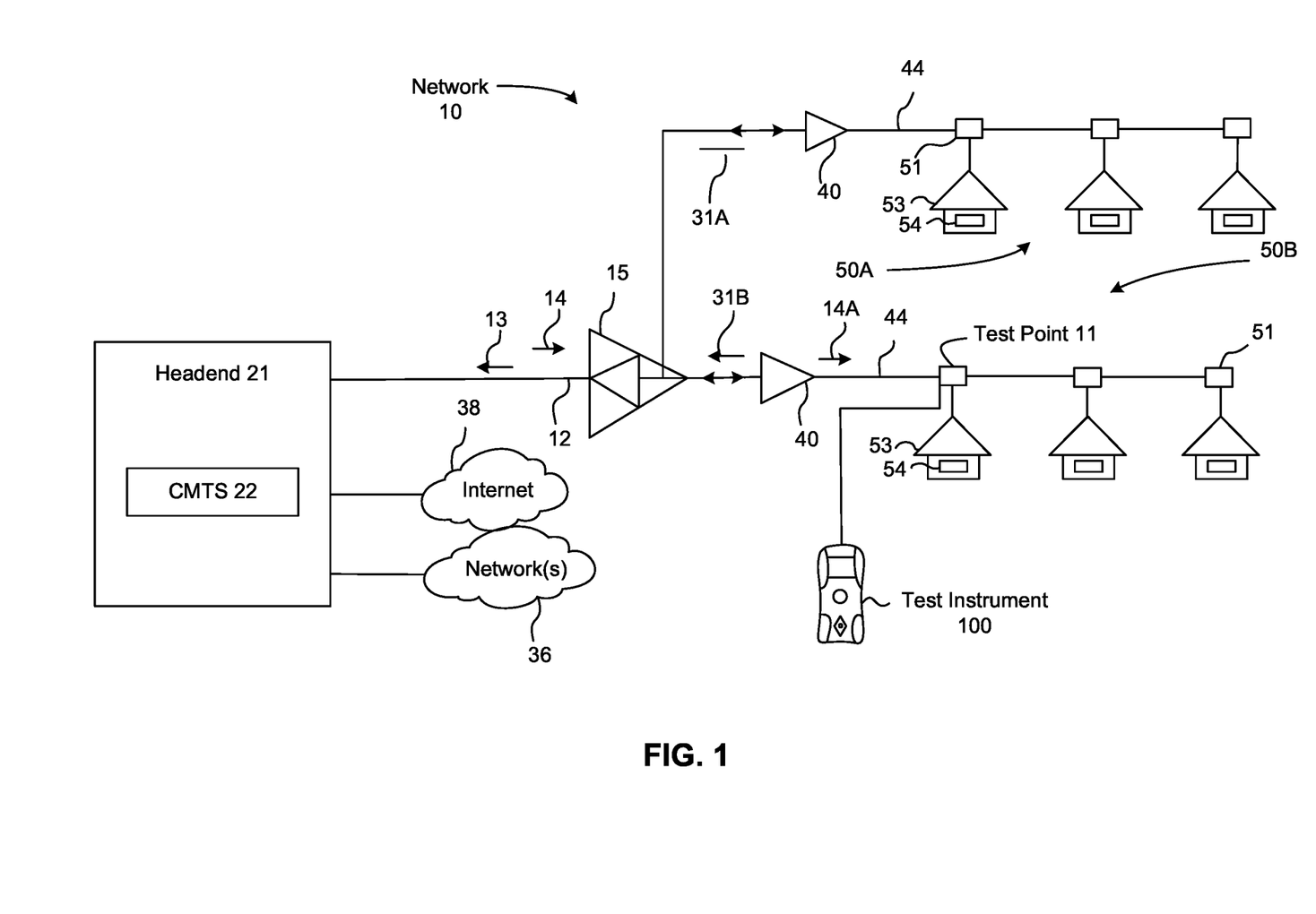
FIG. 1 shows a network according to an example of the present disclosure.

FIG. 1 illustrates a network 10, according to an example of the present disclosure. In this network 10, a test instrument 100 may be used to measure MER and other parameters as discussed herein. More specifically, the test instrument 100 may perform the per-channel MER calibration and determination method described herein to obtain accurate per-channel MER determinations in accordance with the disclosed principles. In the illustrated example, the network 10 is a cable TV network, but the test instrument 100 may be used in other types of networks.

Network 10 may be a portion of a cable TV network that delivers cable TV signals, including digital TV signals and data and control signals, to end users at customer premises 53 in the downstream direction, and receives and forwards data and other signals from the customer premises 53 in the upstream direction. The network 10 may include a hybrid fiber coaxial network or other type of cable TV network. The network 10 includes a headend 21. Upstream signals are transmitted from the customer premises 53 to the headend 21, and downstream signals are transmitted from the headend 21 to the customer premises 53. The headend may include a cable modem termination system (CMTS) 22. The CMTS 22 may handle DOCSIS signals and an edge quadrature amplitude modulation (EQAM) for video signals and may perform other functions known to be performed by headends in cable TV networks.

Downstream radio frequency (RF) signals 14 transmitted from the headend 21 may be distributed to a plurality of end-of-the-line subscribers or end users, for example, via one or more trunk coaxial cables 44 and subscriber taps 51. At the customer premises 53, the downstream signals may be demodulated using cable modems 54, which may be connected to customer premises equipment (not shown), such as wireless routers, set top boxes, smart televisions, personal computers, smartphones, etc.

Upstream RF signals may be transmitted from the customer premises 53 towards the headend 21. First and second groups of customer premises 50A and 50B may send upstream signals 31A and 31B, respectively, which may be combined by a bidirectional amplifier 15 into the upstream RF signal 13 propagating towards the headend 21. In an example embodiment, the upstream RF signal 13 may be converted to an optical signal at a fiber node (not shown) between the customer premises 53 and the headend 21, and the fiber node transmits the upstream signal to the headend 31.

The network 10 may serve a large number of customer premises 50A and 50B, which may be connected by taps 51 to a plurality of trunk coaxial cables 44 at a plurality of different locations. The trunk coaxial cables 44 may be buried in the ground or they may be elevated above the ground on utility poles, or a combination of both. One or more two-way trunk RF amplifiers 40 may be provided in each of the trunk coaxial cables 44 to suitably amplify the upstream and downstream CATV signals on their way to and from the customer premises 53. In other examples, fiber cables may be run to the home and the test instrument 100 may connect to the fiber cables.

The headend 21 may include CMTS 22 and may control and setup data paths in the network 10. The CMTS 22 may support the DOCSIS MAC protocol and upper layer DOCSIS protocols. The CMTS may perform signaling functions, downstream and upstream bandwidth time slot scheduling, and DOCSIS framing. The CMTS 22 or other circuits in the headend 21 may provide video processing functions. The headend 21 may send and receive video and data via the Internet 38 or via other networks 36.

The test instrument 100 may be connected to the network 10 at any desired test point to measure signals transmitted in the network 10. For example, the test instrument 100 is shown as connected to test point 11. The test instrument 100, however, may be connected at any location where connections are available to connect to the network 10. The test points may include test points having access to upstream channels in the network 10, such as a location in the network 10 between the headend 21 and a customer premises 53. The test instrument 100 may be connected to the network 10 via a test access point (tap).

The test instrument 100 may include one or more ports to connect to the test point 11. In an example embodiment, the port(s) may include coaxial RF cable connectors. It will be appreciated that test instrument 100 may also have other non-cable ports, for example, to connect to a computer or to an external display, such as, but not exclusively, one or more USB ports and the like. The test instrument 100 may receive upstream channels in the network 10 and measure the level of the signals and determine a per-channel MER in accordance with the disclosed principles (discussed below).

FIG. 1 depicts the network 10. It should be appreciated that the network 10 may represent a portion of a cable plant. The cable plant may have multiple fiber nodes and multiple branches between the headend 21 and the customer premises 53.

Figure 2A:
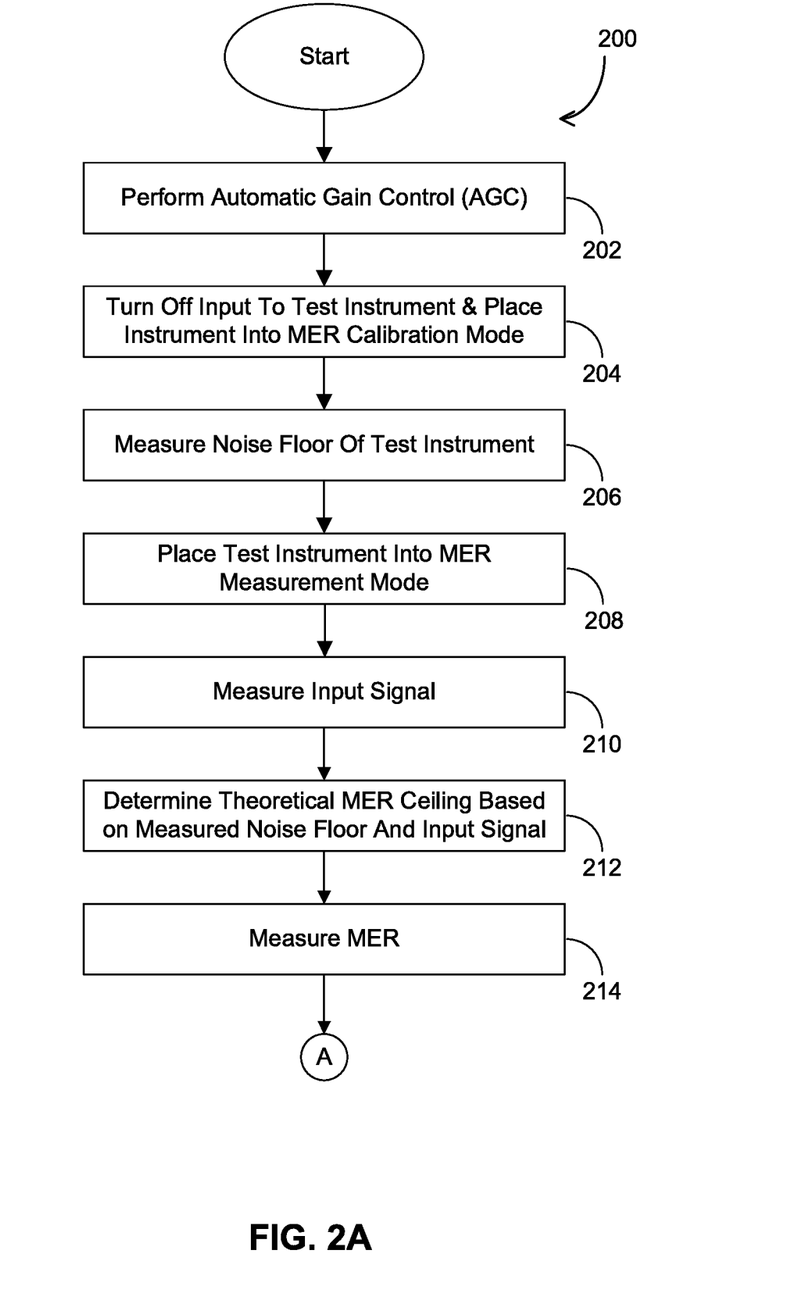
FIGS. 2A and 2B show an example per-channel MER calibration and determination method performed in accordance with the principles disclosed herein.
Figure 2B:
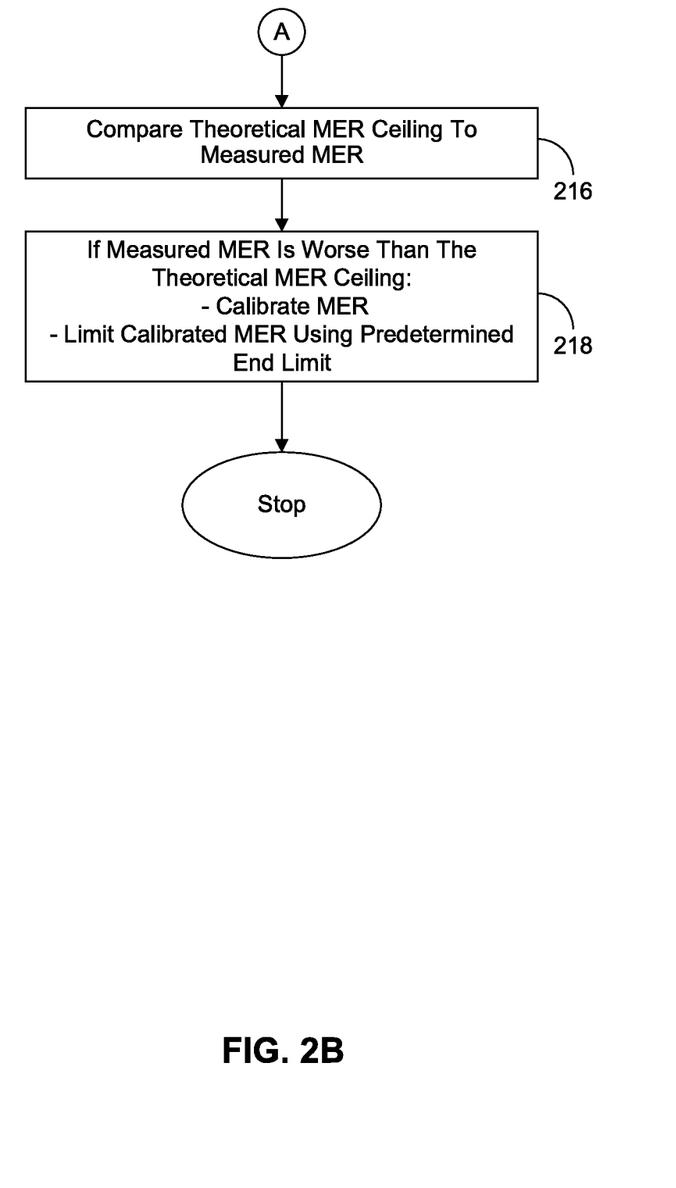

FIGS. 2A and 2B show an example per-channel MER calibration and determination method 200 performed in accordance with the principles disclosed herein. In one embodiment, the method 200 may be performed by a test instrument such as e.g., the OneExpert CATV line of analysis meters manufactured and sold by VIAVI Solutions Inc. In one embodiment, the method 200 may be performed as part of a "DOCSIS Check" function or as part of an "MER Check" or a channel analysis function of the test instrument.

The method 200 begins with the test instrument performing an automatic gain control (AGC) process at step 202. This step may be performed to select the proper gain for signals input via the test instrument's input connector and sent to the measurement receiver within the instrument. In one embodiment, the determined gain is stored in a storage device internal to the test instrument and/or output to the user (e.g., via a display on the test instrument). In one embodiment, this step may be activated by a user via the selection of an appropriate function key and/or menu displayed on the test instrument. For example, in one embodiment, the test instrument could have a dedicated function key, or other key/button, for activating the method 200 (e.g., a key labeled "DOCSIS Check", "MER Check" or a key or keys otherwise associated with the per-channel MER calibration and determination process disclosed herein). In one embodiment, the test instrument could have a dedicated function key, or other key/button, for activating the automatic gain control function itself. In one embodiment, the test instrument could have a menu or other displayed selection mechanism (e.g., software prompt) for activating the method 200 or the automatic gain control function itself. A processor or other control circuit internal to the test instrument may perform step 202 upon receipt of the appropriate activation selection.

At step 204, the input to the test instrument is turned off and the instrument is placed into an MER calibration mode. In one embodiment, the processor or other control circuit internal to the test instrument may perform this step automatically after the automatic gain control (AGC) process completes. In one embodiment, the test instrument may display a prompt for the user to initiate this step. In the MER calibration mode, the test instrument may measure the noise floor of the measurement receiver in the test instrument (at step 206). In one embodiment, the measured noise floor is stored in the storage device internal to the test instrument and/or output to the user (e.g., via a display on the test instrument). In one embodiment, the processor or other control circuit internal to the test instrument may perform this step automatically once it is placed into the MER calibration mode. In one embodiment, the test instrument may display a prompt for the user to manually initiate the noise floor measurement.

At step 208, the test instrument is taken out of the MER calibration mode and placed into an MER measurement mode or any other mode allowing the test instrument to perform the MER processing discussed below. In one embodiment, the processor or other control circuit internal to the test instrument may perform this step automatically after the noise floor measurement is obtained. In one embodiment, the test instrument may display a prompt for the user to manually initiate this step.

The method 200 may now perform per-channel MER calibration and determination in accordance with the disclosed principles. In one embodiment, MER calibration and determinations can be made on all of the channels (i.e., a default setting can be stored in the test instrument indicating that all of the channels require MER analysis). In one embodiment, the user is capable of selecting one or more channels to monitor/analyze. This can be accomplished via a menu selection or other user interface item on or connected to the test instrument.

In one embodiment, per-channel MER calibration and determinations may be made by the processing of steps 210-218. In one embodiment, the processing of steps 210-218 can be performed for each channel or the channels the user selected to monitor/analyze as described above. At step 210, an input signal level for a desired channel is measured at the test instrument. Once the input signal level for the channel is measured, the noise floor measured in step 206 is subtracted from the input signal's power level to estimate a theoretical MER ceiling at step 212. In one embodiment, the theoretical MER ceiling can be stored in the storage device internal to the test instrument and/or output to the user (e.g., via a display on the test instrument). This process can be repeated for each desired channel.

At step 214, the test instrument measures the MER for a desired channel. In one embodiment, the test instrument may measure the channel's MER in the conventional manner. In one embodiment, the measured MER can be stored in the storage device internal to the test instrument and/or output to the user. This process can be repeated for each desired channel. At this point, the test instrument may have a measured MER and a theoretical MER ceiling for each desired channel. To determine the appropriate MER, the method may perform steps 216 and 218 as described below.

For example, for each channel desired, the test instrument may compare the theoretical MER ceiling (e.g., from step 212) to the measured MER (e.g., from step 214) to determine if the measured MER is worse than the theoretical MER ceiling. It is known in the art that MER values are the ratio of average symbol power to average error power. So, in one embodiment, MER values may be converted to average error to average symbol power ratios. For example, the measured MER and theoretical MER ceiling can be converted to linearized average error to average symbol power ratios and if the measured MER has a greater average error to average symbol power ratio than the average error to average symbol power ratio of the theoretical MER ceiling, then the measured MER is worse than the theoretical MER ceiling. In one embodiment, at step 218, when the measured MER is worse than the theoretical MER ceiling, a calibrated MER may be computed to reflect the appropriate MER for the channel. That is, the noise associated with the test instrument is affecting the MER determination and must be compensated for in the MER determination. In one embodiment, the calibrated MER ($C_{MER}$) may be determined using the following equation:

$$C_{MER} = -10 * \log_{10}(L_{MEAS} - L_{MERCEILING}), \quad (1)$$

where $L_{MEAS}$ is the linearized average error to average symbol power ratio of the measured MER and $L_{MERCEILING}$ is the linearized average error to average symbol power ratio of the theoretical MER ceiling. It should be appreciated that equation (1) is but one example of how the calibrated MER may be determined. That is, what is required is that the noise floor of the instrument be removed from the measured MER in one form or another and the invention is not to be limited solely to the processing of equation (1).

In one embodiment, step 218 includes a predetermined end limit to ensure that no negative calibrated MER effects are obtained. That is, allowing the calibration to correct too much may make for an unstable measurement from reading to reading, which would be undesirable. The calibrated MER may be clipped by the end limit as discussed below with respect of FIG. 4. In one embodiment, the end limit is a predetermined integer greater than 1, but less than 20. In one embodiment, the end limit is an integer between 6 and 8. In one embodiment, an end limit of 8 dB was selected to minimize potential instability. As with any value input or determined during method 200, the calibrated MER can be stored in the storage device internal to the test instrument and/or output to the user.

Figure 3:
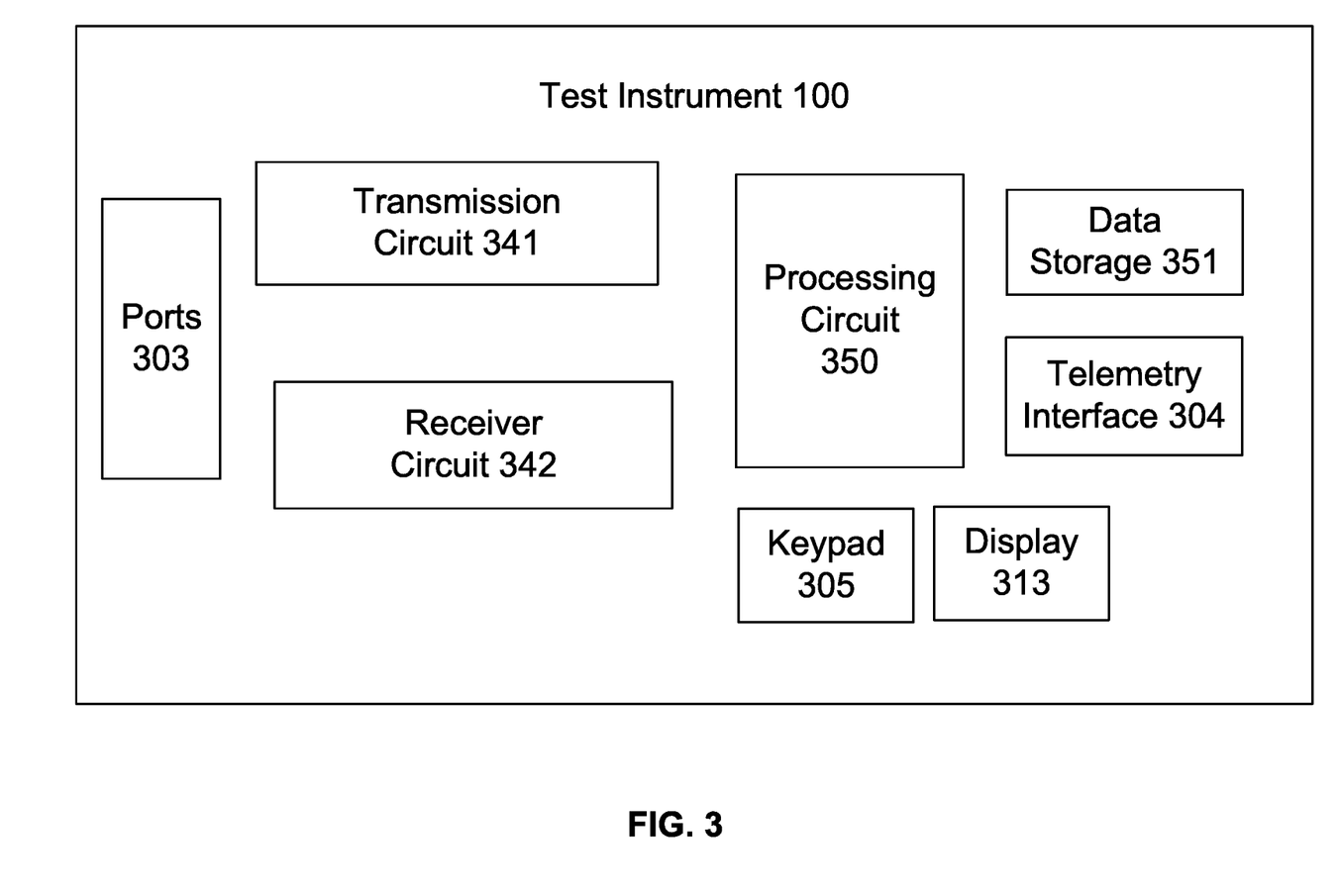
FIG. 3 shows an example of a test instrument for performing the per-channel MER calibration and determination method of FIGS. 2A and 2B in accordance with the principles disclosed herein.

FIG. 3 shows a high-level block diagram of the test instrument 100, according to an example embodiment. It should be appreciated that the test instrument 100 may include components other than those shown. The test instrument 100 may include one or more ports 303 for connecting the test instrument 100 to a test point, such as the test point 11 shown in FIG. 1. The one or more ports 303 may include connectors for connecting to cables in the network 10 carrying traffic for upstream and downstream channels. The traffic may include video, voice and data packets, etc. The test instrument 100 may include a telemetry interface 304 for connecting to a telemetry channel, such as a WiFi interface, Bluetooth interface, cellular interface or another network interface. The test instrument 100 may connect to a remote device via the telemetry interface 304.

The test instrument 100 includes a user interface which may include a keypad 305 and display 313. The display 313 may include a touch screen display. A user may interact with the test instrument 100, such as to enter information, select operations, view measurements, view interference profiles, etc., via the user interface.

A data storage 351 may store any information used by the test instrument 100 and may include memory or another type of known data storage device. The data storage 351 may store MER measured data, MER determined/calibrated data, power level measurements, noise floor data, theoretical MER ceiling data and/or any other measurements or data used by the test instrument 100. The data storage 351 may include a non-transitory computer readable medium storing machine-readable instructions executable by processing circuit 350 to perform operations of the test instrument 100 such as those described for method 200.

Transmission circuit 341 may include a circuit for sending test signals upstream to perform various tests, such as frequency sweep tests. The transmission circuit 341 may include encoders, modulators, and other known component for transmitting signals in the network 10. Receiver circuit 342 may include components for receiving signals from the network 10. The components may include components such as a demodulator, decoder, analog-to-digital converters, and other known components suitable for a receiver circuit.

Processing circuit 350 may include any suitable hardware to perform the operations of the test instrument 100 described herein, including the operations described with respect to FIGS. 2A and 2B and the methods described herein. The operations include measuring and testing operations, including determining signal parameters for upstream and downstream signals transmitted in the network 10 and performing MER calibration and determinations for signals transmitted in the network 10. The hardware of the test instrument 100, including the processing circuit 350, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 350 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

In an example, a technician wishing to test the upstream path at the test point 11 may connect the test instrument 100 to the test point 11 via the one or more ports 303. The technician may select a "DOCSIS Check" or "MER Check" function via the keypad 305 to initiate the method 200 disclosed herein for an upstream channel. The test instrument 100 may receive upstream signals via the test point 11 and generate MER determinations in accordance with the disclosed principles for the upstream channel, which may be presented on the display 313. It should be appreciated that MER determinations may be made on downstream signals as well.

Figure 4:
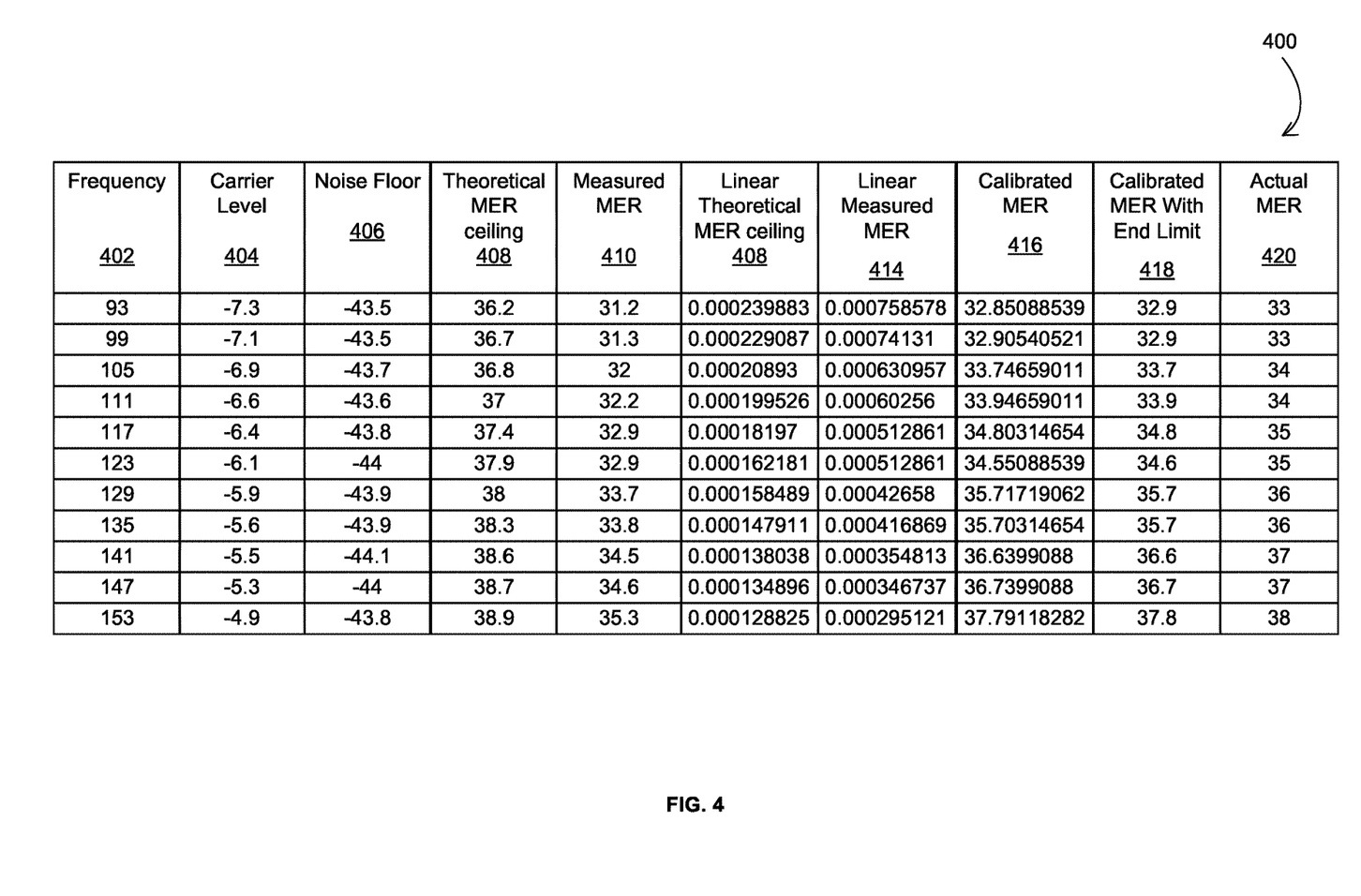
FIG. 4 shows an example table listing measured and/or calculated values obtained and/or used during the method illustrated in FIGS. 2A and 2B in a system with an actual MER ranging between 33 dB and 38 dB.

FIG. 4 shows an example table 400 listing measured and/or calculated values obtained and/or used during the method illustrated in FIGS. 2A and 2B in a system with an actual MER ranging between 33 dB and 38 dB. The table 400 may include a column 402 containing the frequency of one or more monitored channels. The frequency may be measured in MHz. In the illustrated embodiment, there are 11 rows, each one representing a different monitored channel.

The table 400 may include a column 404 containing the input signal level (or carrier level) from the monitored channels (e.g., result of step 210). The input signal level (or carrier level) may be measured in DBMV. The table 400 may include a column 406 containing the noise floor measured in DBMV (e.g., result of step 206). The table 400 may include a column 408 containing the theoretical MER ceiling (e.g., as calculated in step 212) measured in dB. The table 400 may include a column 410 containing the measured MER values (e.g., result of step 214) measured in dB. The table 400 may include a column 412 containing the linearized theoretical MER ceiling and a column 414 containing the linearized measured MER values.

The table 400 may include a column 416 containing the calibrated MER values (e.g., result of step 218) and a column 418 containing the calibrated MER values clipped by the end limit (e.g., result of step 218). In the illustrated example, an end limit of 8 was used. The illustrated table 400 also includes a column 420 with an actual MER that was used for the example.

Figure 5:
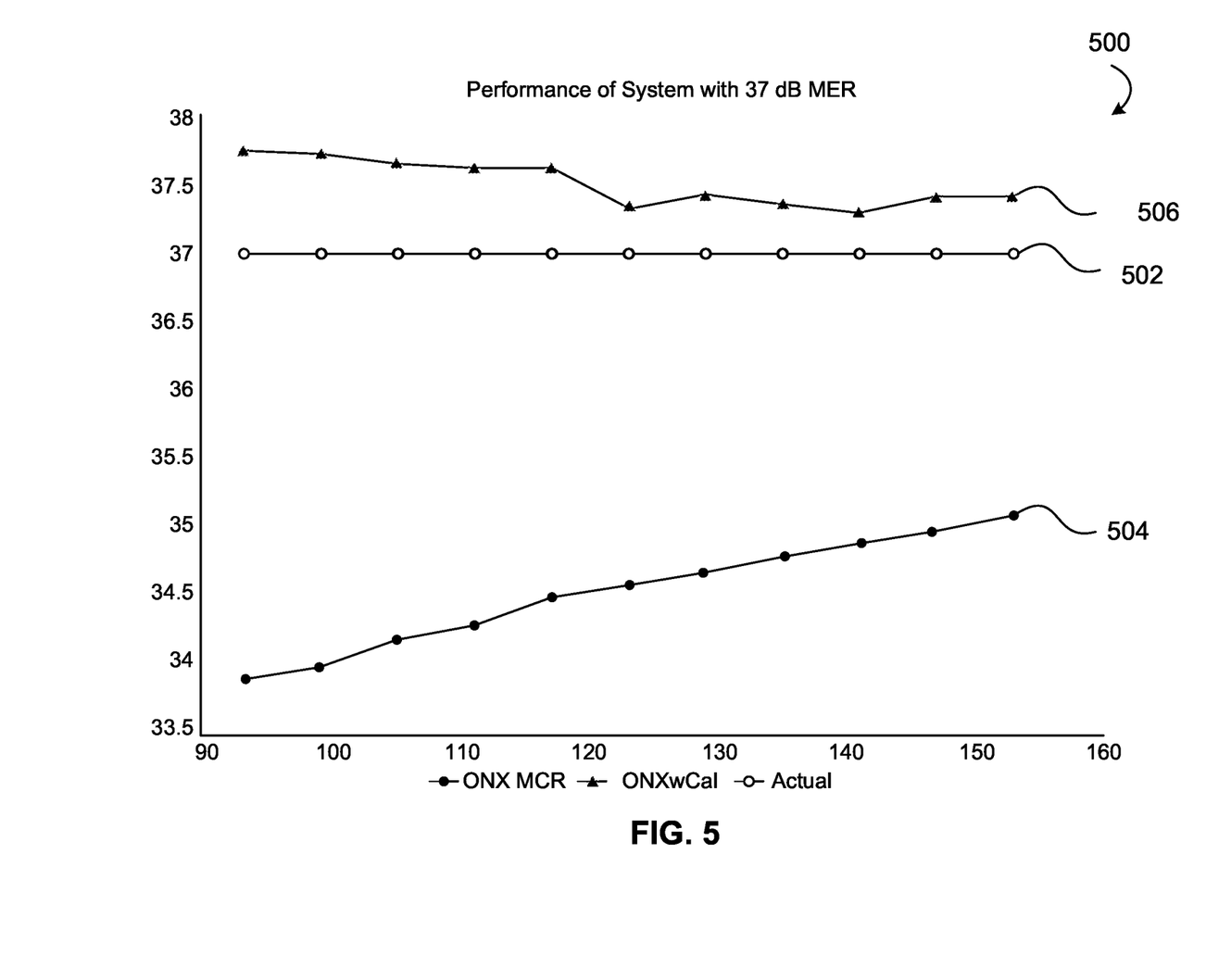
FIG. 5 shows an example graph illustrating MER determinations using the per-channel MER calibration and determination method of FIGS. 2A and 2B in a system with an actual MER of 37 dB in comparison to MER determinations obtained in the conventional manner (i.e., without using the method illustrated in FIGS. 2A and 2B).

FIG. 5 shows an example graph 500 illustrating MER determinations using the per-channel MER calibration and determination method of FIGS. 2A and 2B in a system with an actual MER of 37 dB in comparison to MER determinations obtained in the conventional manner (i.e., without using the method illustrated in FIGS. 2A and 2B). In the illustrated graph 500, the y-axis represents the MER (in dBs) and the x-axis represents the frequencies of the channels tested (in MHz). In the illustrated graph 500, line 502 represents the actual MER of 37 dB, line 504 illustrates the MER determined in the conventional manner and line 506 illustrates the MER determined in accordance with the disclosed principles. In the illustrated example, an end limit of 8 was used.

As can be seen, all of the MER points determined in the conventional manner (i.e., line 504) are approximately 2 dB or more below the actual MER of 37 dB. In that scenario, the user/technician may believe that there is a problem with the network since the MER appears low. In contrast to the conventional approach, the calibrated MER determinations (i.e., line 506) are all above the actual MER of 37 dB. These MER determinations better represent the MER in the system. In addition, since the MER determinations are relatively high, the technician may deem that the network is performing well.

The apparatus, system and method for implementing per-channel MER calibration and MER determinations disclosed herein provides numerous advantages over the current state of the art. For example, the per-channel MER calibration and determinations are more accurate than the conventional determinations and better reflect the true performance of the network and the monitored channels. This reduces the possibility that the service provider will waste man-power, resources, time and/or money performing unnecessary unscheduled maintenance and or other countermeasures chasing down a problem that may not exist. In addition, no additional hardware is needed to carry out the method 200 disclosed herein—i.e., no additional hardware is required to filter out high amplitude signals from the input signal to measure the low input signals because the calibrated MER determinations disclosed herein can be made without filtering. Thus, in one embodiment, the method 200 may be ported to pre-existing test instruments as part of a software upgrade. This means that the disclosed principles may be deployed on tens of thousands of test instruments that are already deployed in the field.

It should be appreciated that slight variations to the disclosed method 200 may be implemented and the claimed invention may include these variations. For example, one alternative may be to measure each channel at a known calibration station where the measured MER is mapped to an actual MER. Another alternative may be to measure and store the noise floor for each AGC setting at calibration time.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, said method being performed on a test instrument adapted to monitor one or more channels in a multi-channel network, said method comprising:
    determining a noise floor of the test instrument;
    for each channel of the one or more channels being monitored by the test instrument:
        measuring an input signal received over the channel;
        determining a theoretical modulation error ratio (MER) ceiling based on the input signal and the noise floor of the test instrument;
        measuring an MER for the channel; and
        computing a calibrated MER based on a comparison of the measured MER to the theoretical MER ceiling.

2. The method of claim 1, wherein the calibrated MER is clipped by a predetermined end limit.

3. The method of claim 1, wherein the theoretical MER ceiling is determined by subtracting the noise floor of the test instrument from the input signal.

4. The method of claim 1, wherein computing the calibrated MER comprises:
    converting the measured MER to a first linearized average error to average symbol power ratio;
    converting the theoretical MER ceiling to a second linearized average error to average symbol power ratio;
    determining whether the first linearized average error to average symbol power ratio is greater than the second linearized average error to average symbol power ratio; and
    computing the calibrated MER when it is determined that the first linearized average error to average symbol power ratio is greater than the second linearized average error to average symbol power ratio.

5. The method of claim 4, wherein the calibrated MER ($C_{MER}$) is computed using the following equation:

$$C_{MER} = -10 * \log_{10}(L_{MEAS} - L_{MERCEILING}),$$

wherein $L_{MEAS}$ is the first linearized average error to average symbol power ratio and $L_{MERCEILING}$ is the second linearized average error to average symbol power ratio.

6. The method of claim 1, further comprising performing automatic gain control process to select a gain for signals input by the test instrument.

7. The method of claim 1, further comprising:
    turning off an input to the test instrument; and
    placing the test instrument in to a calibration mode,
    wherein the noise floor is determined as part of the calibration mode.

8. A test instrument for monitoring one or more channels in a multi-channel network, said test instrument comprising:
    a storage device; and
    a processor executing program instructions stored in the storage device and being configured to:
        determine a noise floor of the test instrument,
        for each channel of the one or more channels being monitored by the test instrument:
            measure an input signal received over the channel;
            determine a theoretical modulation error ratio (MER) ceiling based on the input signal and the noise floor of the test instrument;
            measure an MER for the channel; and
            compute a calibrated MER based on a comparison of the measured MER to the theoretical MER ceiling.

9. The test instrument of claim 8, wherein the processor is adapted to clip the calibrated MER by a predetermined end limit.

10. The test instrument of claim 8, wherein the processor determines the theoretical MER ceiling by subtracting the noise floor of the test instrument from the input signal.

11. The test instrument of claim 8, wherein the processor computes the calibrated MER by:
    converting the measured MER to a first linearized average error to average symbol power ratio;
    converting the theoretical MER ceiling to a second linearized average error to average symbol power ratio;
    determining whether the first linearized average error to average symbol power ratio is greater than the second linearized average error to average symbol power ratio; and
    computing the calibrated MER when it is determined that the first linearized average error to average symbol power ratio is greater than the second linearized average error to average symbol power ratio.

12. The test instrument of claim 11, wherein the processor computes the calibrated MER ($C_{MER}$) using the following equation:

$$C_{MER} = -10 * \log_{10}(L_{MEAS} - L_{MERCEILING}),$$

wherein $L_{MEAS}$ is the first linearized average error to average symbol power ratio and $L_{MERCEILING}$ is the second linearized average error to average symbol power ratio.

13. The test instrument of claim 8, wherein the processor is configured to perform an automatic gain control process to select a gain for signals input by the test instrument.

14. The test instrument of claim 8, wherein the processor is configured to:
    turn off an input to the test instrument; and
    place the test instrument in to a calibration mode,
    wherein the noise floor is determined as part of the calibration mode.

15. A test instrument for monitoring one or more channels in a multi-channel network, said test instrument comprising:
    a storage device; and
    a processor executing program instructions stored in the storage device and being configured to:

perform an automatic gain control process to select a gain for signals input by the test instrument;

determine a noise floor of the test instrument, for each channel of the one or more channels being monitored by the test instrument:

measure an input signal received over the channel;

determine a theoretical modulation error ratio (MER) ceiling by subtracting the noise floor of the test instrument from the input signal;

measure an MER for the channel; and compute a calibrated MER based on a comparison of the measured MER to the theoretical MER ceiling.

16. The test instrument of claim 15, wherein the processor is adapted to clip the calibrated MER by a predetermined end limit to ensure that the calibrated MER is not a negative value.

17. The test instrument of claim 15, wherein the processor computes the calibrated MER by:

converting the measured MER to a first linearized average error to average symbol power ratio;

converting the theoretical MER ceiling to a second linearized average error to average symbol power ratio;

determining whether the first linearized average error to average symbol power ratio is greater than the second linearized average error to average symbol power ratio; and    computing the calibrated MER when it is determined that the first linearized average error to average symbol power ratio is greater than the second linearized average error to average symbol power ratio.

18. The test instrument of claim 15, wherein the processor is configured to:

turn off an input to the test instrument; and place the test instrument in to a calibration mode, wherein the noise floor is determined as part of the calibration mode.

\* \* \* \* \*